(12) United States Patent
Pursifull et al.

(10) Patent No.: US 10,347,058 B2
(45) Date of Patent: Jul. 9, 2019

(54) METHODS AND APPARATUS FOR VEHICLE MAINTENANCE EVENT DETECTION AND RECORDING

(71) Applicant: Ford Global Technologies, LLC, Dearborn, MI (US)

(72) Inventors: Ross Dykstra Pursifull, Dearborn, MI (US); Michael James Uhrich, Wixom, MI (US); Dilip B. Patel, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/823,062

(22) Filed: Nov. 27, 2017

(65) Prior Publication Data

US 2019/0164360 A1 May 30, 2019

(51) Int. Cl.
*G07C 5/08* (2006.01)
*G06Q 10/00* (2012.01)
*G07C 5/00* (2006.01)

(52) U.S. Cl.
CPC ............ *G07C 5/085* (2013.01); *G06Q 10/20* (2013.01); *G07C 5/006* (2013.01); *G07C 5/0808* (2013.01)

(58) Field of Classification Search
USPC ........................................................ 701/29.4
See application file for complete search history.

(56) References Cited

U.S. PATENT DOCUMENTS

| | | | |
|---|---|---|---|
| 7,075,421 B1 | 7/2006 | Tuttle | |
| 7,308,344 B2 | 12/2007 | Hayashi | |
| 7,562,568 B2 | 7/2009 | Huang et al. | |
| 8,482,395 B2 | 7/2013 | Rysenga et al. | |
| 9,278,589 B2 | 3/2016 | Laifenfeld et al. | |
| 9,286,266 B1 | 3/2016 | Fleck et al. | |
| 9,636,956 B2 | 5/2017 | Xu | |
| 2003/0145650 A1* | 8/2003 | Juzswik | B60C 23/0416 73/146 |
| 2007/0271014 A1* | 11/2007 | Breed | B60J 10/00 701/31.9 |
| 2009/0043441 A1* | 2/2009 | Breed | G06K 7/10178 701/31.9 |

(Continued)

FOREIGN PATENT DOCUMENTS

| | | |
|---|---|---|
| DE | 102006005143 | 8/2007 |
| JP | 3815304 | 8/2006 |
| JP | 2007112169 | 5/2007 |

OTHER PUBLICATIONS

Indiegogo, ZUS Smart Tire Safety Monitor, retrieved from https://www.indiegogo.com/projects/zus-smart-tire-safety-monitor--2#/, retrieved on Aug. 18, 2017, 11 pages.

*Primary Examiner* — Tyler D Paige
(74) *Attorney, Agent, or Firm* — Ray Coppiellie; Hanley, Flight & Zimmerman, LLC

(57) ABSTRACT

Methods, apparatus, systems and articles of manufacture are disclosed for vehicle maintenance event detection and recording. An example apparatus includes a maintenance event detector to detect a first maintenance event including at least one of a tire rotation event or a fluid change event, a parameter recorder to store in a service log a vehicle location, a time, and a vehicle travel distance at which the first maintenance event occurred, and a distance targeter to determine a target distance for a second maintenance event based on information stored in the service log.

20 Claims, 11 Drawing Sheets

(56) References Cited

U.S. PATENT DOCUMENTS

| | | | |
|---|---|---|---|
| 2010/0087985 A1* | 4/2010 | Boss | G07C 5/008 |
| | | | 701/33.4 |
| 2010/0225464 A1* | 9/2010 | Oda | B60C 23/0408 |
| | | | 340/459 |
| 2013/0325541 A1* | 12/2013 | Capriotti | G06Q 10/20 |
| | | | 705/7.21 |
| 2014/0229391 A1* | 8/2014 | East, III | G06Q 10/20 |
| | | | 705/305 |
| 2015/0286994 A1 | 10/2015 | Elder | |
| 2016/0042576 A1* | 2/2016 | Fischer | G05B 23/0283 |
| | | | 701/29.4 |
| 2017/0050476 A1 | 2/2017 | Liu et al. | |
| 2017/0113494 A1 | 4/2017 | Singh et al. | |
| 2017/0364869 A1* | 12/2017 | Tarte | G06Q 10/1095 |

* cited by examiner

| CONFIGURATION | | VALID? | LOCATION | DISTANCE AT ROTATION | TIME | TOTAL CONFIGURATION DISTANCE | RECOMMENDED NEXT ROTATION DISTANCE |
|---|---|---|---|---|---|---|---|
| PREV. | NEW | | | | | | |
| 1 | 2 | Y | BOB'S AUTO SERVICE (DETROIT, MI) | 9,000 MILES | 9/24/16 4:52 PM | 1: 9,000 MILES | 18,000 MILES |
| 2 | 1 | Y | BILL'S TIRE CHANGE (CHICAGO, IL) | 19,500 MILES | 11/12/16 8:30 AM | 2: 10,500 MILES | 30,000 MILES |
| 1 | 2 | Y | TIRE ROTATION SERVICES (MILWAUKEE, WI) | 29,000 MILES | 1/3/17 12:30 PM | 1: 18,500 MILES | 37,000 MILES |
| 2 | 1 | Y | BILL'S TIRE CHANGE (CHICAGO, IL) | 37,000 MILES | 2/27/17 6:00 PM | 2: 18,500 MILES | 46,000 MILES |
| 1 | X | N | BOB'S AUTO SERVICE (DETROIT, MI) | 46,500 MILES | 7/8/17 11:00 AM | 1: 28,000 MILES | 46,500 MILES |

FIG. 4

| | FLUID CHANGED | VALID? | LOCATION | DISTANCE AT CHANGE | TIME | DISTANCE SINCE PREVIOUS CHANGE | RECOMMENDED NEXT CHANGE DISTANCE |
|---|---|---|---|---|---|---|---|
| 516 | BRAKE | Y | BOB'S AUTO SERVICE (DETROIT, MI) | 8,500 MILES | 8/22/16 2:54 PM | 8,500 MILES | 48,500 MILES |
| 518 | OIL | Y | TIM'S OIL CHANGE (CHICAGO, IL) | 19,000 MILES | 12/5/16 10:35 AM | 19,000 MILES | 39,000 MILES |
| 520 | COOLANT | Y | FLUID CHANGE SERVICES (MILWAUKEE, WI) | 29,000 MILES | 1/24/17 2:17 PM | 29,000 MILES | 64,000 MILES |
| 522 | OIL | N | TIM'S OIL CHANGE (CHICAGO, IL) | 38,500 MILES | 3/6/17 7:05 PM | 19,500 MILES | 38,500 MILES |

FIG. 5

METHODS AND APPARATUS FOR VEHICLE MAINTENANCE EVENT DETECTION AND RECORDING

FIELD OF THE DISCLOSURE

This disclosure relates generally to vehicles, and, more particularly, to vehicle maintenance event detection and recording.

BACKGROUND

In recent years, vehicles have required less scheduled maintenance (fluid changes, tire rotations, air filter changes, etc.) than in the past. While this trend reduces the time users spend maintaining their vehicles, it has also led consumers to miss or delay scheduled maintenance milestones for their vehicles. Missing or delaying scheduled maintenance not only causes additional wear on the vehicle, but can also negate the consumer's warranty.

Additionally, even if the consumer does complete all scheduled maintenance on their vehicle at the recommended times, keeping an accurate and thorough record of maintenance events (fluid changes, tire rotations, etc.) is needed to utilize the warranty on the vehicle. For example, a warranty claim on a tire of the vehicle can be negated by not rotating the tires at proper (e.g., targeted) intervals or not having documentation of rotating the tires at targeted intervals.

SUMMARY

An apparatus for vehicle maintenance event detection and recording is disclosed herein. An example apparatus includes a maintenance event detector to detect a first maintenance event including at least one of a tire rotation event or a fluid change event, a parameter recorder to store in a service log a vehicle location, a time, and a vehicle travel distance at which the first maintenance event occurred, and a distance targeter to determine a targeted distance for a second maintenance event based on information stored in the service log.

Another example apparatus includes a vehicle maintenance diagnostic processor programmed to detect a first tire rotation event, and wherein the processor is to record at least one of a vehicle location, a time, and a vehicle travel distance for the first tire rotation event and calculate a target distance for a second tire rotation event based on information recorded.

An example method includes detecting a first maintenance event including at least one of a tire rotation event or a fluid change event, storing, in a service log, a vehicle location, a time, and a vehicle travel distance at which the first maintenance event occurred in response to detecting the first maintenance event, and determining a target distance for a second maintenance event based on information stored in the service log.

BRIEF DESCRIPTION OF THE DRAWINGS

FIG. 4 is an example service log generated by the vehicle maintenance diagnostic processor of FIG. 1 for tire rotation events.

FIG. 5 is an example service log generated by the vehicle maintenance diagnostic processor of FIG. 1 for fluid change events.

The figures are not to scale. Wherever possible, the same reference numbers will be used throughout the drawing(s) and accompanying written description to refer to the same or like parts.

DETAILED DESCRIPTION

Figure 1:
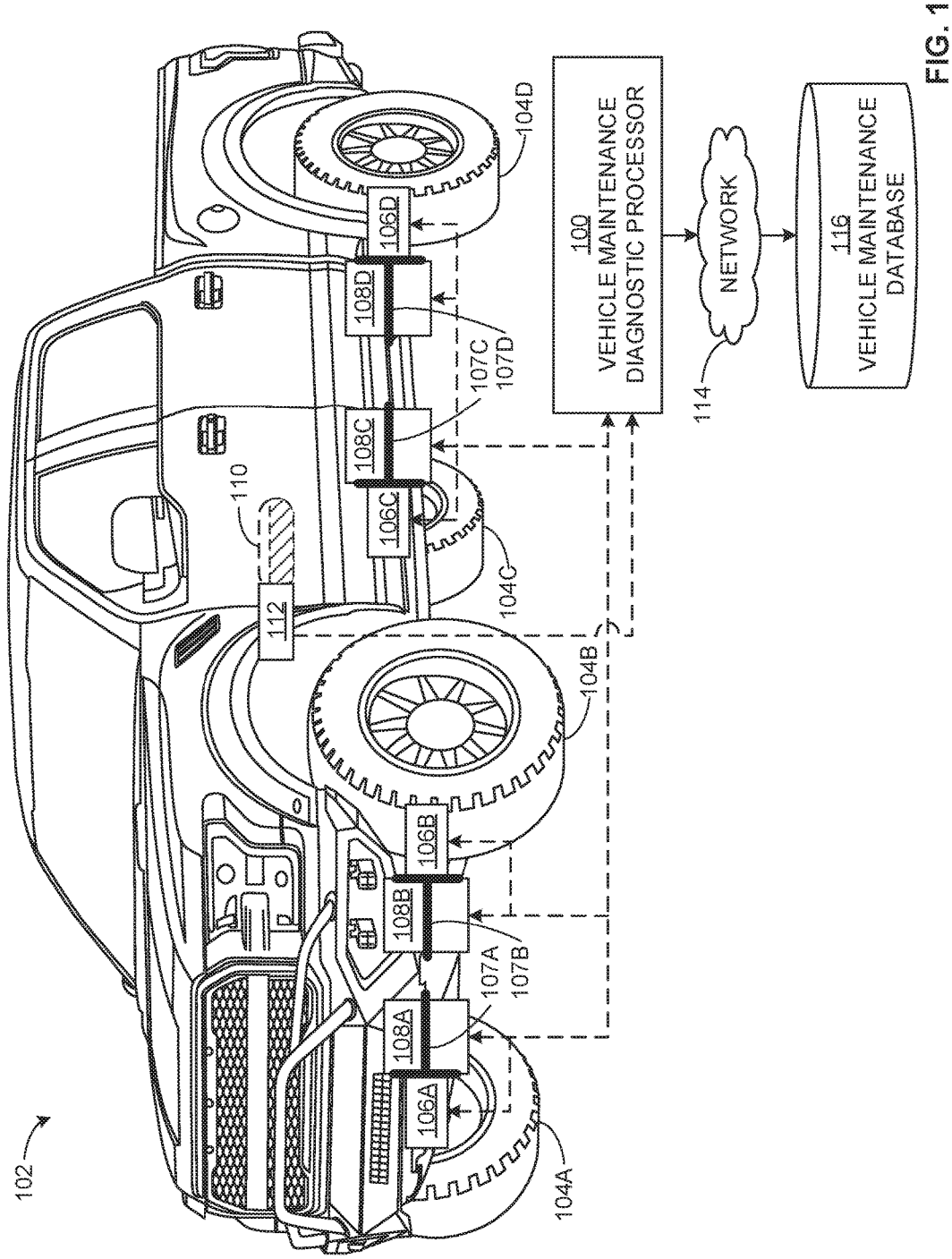
FIG. 1 illustrates an example vehicle including a vehicle maintenance diagnostic processor by which the examples disclosed herein can be implemented.

Many modern vehicles require less scheduled maintenance (fluid changes, tire rotations, air filter changes, etc.) than in the past. While this trend is generally seen as providing a better experience to the consumer, it has also led consumers to miss and/or skip scheduled maintenance milestones for their vehicles. Missing or skipping scheduled maintenance can, in addition to causing additional wear on the vehicle, negate the consumer's warranty.

One such example of this is an oil change and its interaction with a tire rotation. In the past, it was oftentimes recommended (e.g., targeted) to rotate vehicle tires each time the vehicle had an oil change. This led to a vehicle undergoing both a tire rotation and an oil change every 10,000 miles. However, in some vehicles and/or using some types of oil, vehicles can now operate for 20,000 miles or more between oil changes and many auto/tire manufacturers have not changed their recommendations regarding scheduling of tire rotations. As such, for vehicles with extended maintenance windows for oil changes, users will be required to separately rotate the tires of their vehicle beyond rotating the tires of the vehicle each time the oil is changed.

Additionally, in some cases, the consumer may complete all scheduled maintenance on their vehicle at the targeted times, but may not keep an accurate and thorough record of the maintenance events (fluid changes, tire rotations, etc.). In such examples, the consumer may be unable to use their warranty if a provider of the warranty requires detailed service logs to ensure the consumer was properly maintaining their vehicle.

Examples disclosed herein automatically detect, record, and validate maintenance events completed on a vehicle. More specifically, the examples detect at least one of a tire rotation event or a fluid change event. The examples detect a tire rotation event when one or more tires change location on a vehicle and detect a fluid change when a level of a fluid changes from a first level to a second level. While the examples disclosed herein are described as being applied to tire rotation and fluid change events for a vehicle, the teachings of this disclosure may be more generally applied to any other maintenance event performed on a vehicle.

As will be set forth in greater detail below, the examples described herein provide a vehicle maintenance diagnostic processor to detect and record at least one of a tire rotation or a fluid change.

In some examples, in response to detecting at least one of a tire rotation or a fluid change, the vehicle maintenance diagnostic processor can further determine at least one of a location and/or service station, a date and time, and a total vehicle travel distance at which the maintenance event occurs. In some examples, the processor can further record said maintenance event parameters in a service record storer.

Additionally or alternatively, in response to detecting at least one of a tire rotation or a fluid change, the vehicle maintenance diagnostic processor can validate the tire rotation or fluid change. In some examples, validating the tire rotation event can further include determining that each tire of the vehicle was rotated to a recommended (e.g., target) position on the vehicle and validating the fluid change event can further include determining that the level of the fluid changed was filled to a recommended (e.g., target) level. In response to detecting a maintenance event is invalid, the vehicle maintenance diagnostic processor can further generate an alert to notify a user of the vehicle that maintenance was improperly performed.

Additionally or alternatively, the vehicle maintenance diagnostic processor can suggest a vehicle travel distance for a future maintenance event (e.g., a travel distance target). In some examples, the vehicle maintenance diagnostic processor can suggest a travel distance target for a tire rotation such that the total distance traveled on a first tire rotation configuration (e.g., a configuration of tire locations) balances with the total distance traveled on a second configuration of tire locations. Alternatively, in some examples, the vehicle maintenance diagnostic processor can suggest a travel distance target for a fluid change based on a manufacturer specified fluid change distance (e.g., a travel distance between oil changes suggested (e.g., targeted) by an oil manufacturer). In some examples, the vehicle maintenance diagnostic processor can further record the travel distance target for the future maintenance event in the service record storer.

Additionally or alternatively, based on the travel distance target for a future maintenance event determined, the vehicle maintenance diagnostic processor can further determine whether, based on the current vehicle travel distance, maintenance is required (e.g., targeted) or will be targeted in the near future (e.g., within the next week, within the next 500 miles, within the next 100 miles, etc.). In response to determining maintenance is targeted or will be targeted in the near future, the vehicle maintenance diagnostic processor can further notify a user of the vehicle to the upcoming maintenance and, in some examples, can suggest to the user of the vehicle a service station and time to complete the required (e.g., targeted) maintenance.

As will be discussed in greater detail below in accordance with the teachings of this disclosure, the vehicle maintenance diagnostic processor can have various configurations that may depend on a type of vehicle and/or specific characteristics of the maintenance events required by the vehicle. In examples disclosed herein, these configurations can be changed or altered to optimize the ability of the vehicle maintenance diagnostic processor to properly diagnose a vehicle maintenance event and record information relating to the event.

Turning to FIG. 1, an example vehicle maintenance diagnostic processor 100 disclosed herein operates in an example vehicle 102. In some examples, the vehicle 102 may have one or more tires 104. In the illustrated example of FIG. 1, the vehicle 102 has four (4) tires 104A, 104B, 104C, and 104D and the tire 104A is in the front right (FR) position, tire 104B is in the front left (FL) position, tire 104C is in the back right (BR) position, and tire 104D is in the back left (BL) position. Coupled to each of the tires 104 is an example tire pressure monitor system (TPMS) sensor 106. In the illustrated example of FIG. 1, the tire 104A contains a TPMS sensor 106A, the tire 104B contains a TPMS sensor 106B, the tire 104C contains a TPMS sensor 106C, and the tire 104D contains a TPMS sensor 106D.

In some examples, the TPMS sensors 106 collect data on one or more tires 104. For example, the TPMS sensors 106 can collect pressure data for the tires 104. Additionally or alternatively, the TPMS sensors 106 can collect temperature data for the tires 104. Additionally or alternatively, the TPMS sensors 106 can collect orientation data for the sensor (e.g., the TPMS sensor 106 is vertical, the TPMS sensor 106 is horizontal, the TPMS sensor 106 is 30° from horizontal, etc.). Additionally or alternatively, the TPMS sensors 106 can determine an angular rotation (e.g., an angular displacement) of the tires 104 over a monitoring period (e.g., the tire 104A rotated 450 degrees over 3 seconds, the tire 104B rotated 480 degrees over 3 seconds, etc.).

In some examples, each of the TPMS sensors 106 has an identifier that is unique (e.g., a serial number) to that sensor. In the illustrated example of FIG. 1, each of the TPMS sensors 106A, 106B, 106C, and 106D has a unique serial number. In some examples, each of the TPMS sensors 106A, 106B. 106C, and 106D is further to communicate at least one of pressure data, orientation data, angular rotation data (e.g., displacement data), temperature data, and a unique serial number to the vehicle maintenance diagnostic processor 100.

The tires 104 are further coupled to one or more wheel assemblies 107, each of the wheel assemblies 107 including a wheel assembly rotation sensor 108. In the illustrated example of FIG. 1, the tire 104A is coupled to the wheel assembly 107A including wheel assembly rotation sensor 108A, the tire 104B is coupled to the wheel assembly 107B including wheel assembly rotation sensor 108B, the tire 104C is coupled to the wheel assembly 107C including wheel assembly rotation sensor 108C, and the tire 104D is coupled to the wheel assembly 107D including wheel assembly rotation sensor 108D. In some examples, the wheel assembly rotation sensors 108 determine an instantaneous orientation (e.g., the wheel assembly rotation sensor 108 is horizontal, the wheel assembly rotation sensor 108 is vertical, the wheel assembly rotation sensor 108 is 30 degrees from vertical, etc.) of each of the wheel assemblies 107.

Additionally or alternatively, the wheel assembly rotation sensors 108 can determine an orientation of the wheel assemblies 107 at discrete intervals (e.g., the wheel assembly rotation sensors 108 can detect every 6 degrees of rotation of the wheel assemblies 107, every 30 degrees of rotation of the wheel assemblies 107, etc.). Additionally or alternatively, the wheel assembly rotation sensors 108 can determine an angular rotation (e.g., an angular displacement) of the wheel assemblies 107 over a monitoring period (e.g., the wheel assembly 107A rotated 450 degrees over 3 seconds, the wheel assembly 107B rotated 7,800 degrees over 12 seconds, etc.). In some examples, the wheel assembly rotation sensors 108 can further communicate at least one of the angular rotation data (e.g., displacement data) or orientation data of each of the wheel assemblies 107 to the vehicle maintenance diagnostic processor 100. Additionally, each of the wheel assembly rotation sensors 108 remains in its original position on the vehicle 102. For example, the wheel assembly rotation sensor 108A will always be the FR wheel assembly rotation sensor, the wheel assembly rotation sensor 108B will always be the FL wheel assembly rotation sensor, the wheel assembly rotation sensor 108C will always be the BR wheel assembly rotation sensor, and wheel assembly rotation sensor 108D will always be the BL wheel assembly rotation sensor.

The vehicle 102 further includes a fluid 110. In some examples, the fluid 110 can be oil, windshield washer fluid, brake fluid, transmission fluid, or any other fluid utilized for operation of the vehicle 102. Typically, the fluid 110 is required to be changed or refilled at periodic intervals. To measure the level of the fluid before and/or after a fluid change and/or refill, the vehicle 102 further includes a fluid level sensor 112 coupled to a reservoir holding the fluid 110. In some examples, the fluid level sensor 112 can further communicate the level of the fluid 110 to the vehicle maintenance diagnostic processor 100.

In some examples of the vehicle 102, the vehicle maintenance diagnostic processor 100 is further to connect to an example network 114. For example, the network 114 of the illustrated example of FIG. 1 is the Internet. However, the network 114 may be implemented using any suitable wired and/or wireless network(s) including, for example, one or more data buses, one or more Local Area Networks (LANs), one or more wireless LANs, one or more cellular networks, one or more private networks, one or more public networks, etc. The network 114 enables the example vehicle maintenance diagnostic processor 100 to be in communication with a vehicle maintenance database 116. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

The vehicle maintenance database 116, connected to the vehicle maintenance diagnostic processor 100X) via the network 114, is used to record data (e.g., obtained information, generated messages, etc.) generated by the vehicle maintenance diagnostic processor 100 for the vehicle 102. In some examples, the vehicle maintenance database 116 can record data from multiple vehicle maintenance diagnostic processors 100 contained in multiple vehicles 102. For example, the vehicle maintenance database 116 can record data from a fleet of vehicles 102. The vehicle maintenance database 116 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The vehicle maintenance database 116 may additionally or alternatively be implemented by one or more double data rate (DDR) memories, such as DDR, DDR2, DDR3, mobile DDR (mDDR), etc. The vehicle maintenance database 116 may additionally or alternatively be implemented by one or more mass storage devices such as hard disk drive(s), compact disk drive(s) digital versatile disk drive(s), etc. While in the illustrated example the vehicle maintenance database 116 is illustrated as a single database, the vehicle maintenance database 116 may be implemented by any number and/or type(s) of databases. Further, the vehicle maintenance database 116 may be located in the vehicle 102 or at a central location outside of the vehicle 102. Furthermore, the data stored in the vehicle maintenance database 116 may be in any data format such as, for example, binary data, comma delimited data, tab delimited data, structured query language (SQL) structures, etc.

FIGS. 2A and 2B are an illustrated example of a maintenance event 200, wherein the maintenance event 200 is completed on the vehicle 102. In the example, FIG. 2A illustrates the vehicle 102 prior to the maintenance event 200, and FIG. 2B illustrates the vehicle 102 after the maintenance event 200.

The maintenance event 200 includes a rotation of the tires 104. In the illustrated example of FIGS. 2A and 2B, the tire 104A and the TPMS sensor 106A have moved from the FR to the BL position on the vehicle 102. As such, the tire 104A and the TPMS sensor 106A are now coupled to the wheel assembly 107D and the wheel assembly rotation sensor 108D. Additionally, the tire 104B and the TPMS sensor 106B have moved from the FL position to the BR position on the vehicle 102. As such, the tire 104B and the TPMS sensor 106B are now coupled to the wheel assembly 107C and the wheel assembly rotation sensor 108C. Additionally, the tire 104C and the TPMS sensor 106C have moved from the BR position to the FL position on the vehicle 102. As such, the tire 104C and the TPMS sensor 106C are now coupled to the wheel assembly 107B and the wheel assembly rotation sensor 108B. Additionally, the tire 104D and the TPMS sensor 106D have moved from the BL position to the FR position on the vehicle 102. As such, the tire 104D and the TPMS sensor 106D are now coupled to the wheel assembly 107A and the wheel assembly rotation sensor 108A.

While one example tire rotation pattern (e.g., an X-pattern or a crisscross pattern) is illustrated in the maintenance event 200 of FIGS. 2A and 2B, any example tire rotation pattern can be utilized. For example, a front to back rotation (e.g., FL and FR rotate to BL and BR, respectively, and BL and BR rotate to FL and FR respectively), a rearward cross (e.g., FL and FR rotate to BR and BL, respectively, and BL and BR rotate to FL and FR, respectively), a forward cross (e.g., FL and FR rotate to BL and BR, respectively, and BL and BR rotate to FR and FL, respectively), or any other rotation of the FL, FR, BL, and BR tires 104 can be utilized.

Additionally, the maintenance event 200 includes a change of the fluid 110. In the illustrated example of FIGS. 2A and 2B, the fluid 110 changes from a first level in FIG. 2A to a second level in FIG. 2B after the maintenance event 200 is complete. Further, while the second level of the fluid 110 is illustrated as greater than the first level of the fluid 110, the second level of the fluid 110 can also be less than or equal to the first level of the fluid 110.

Figure 3:
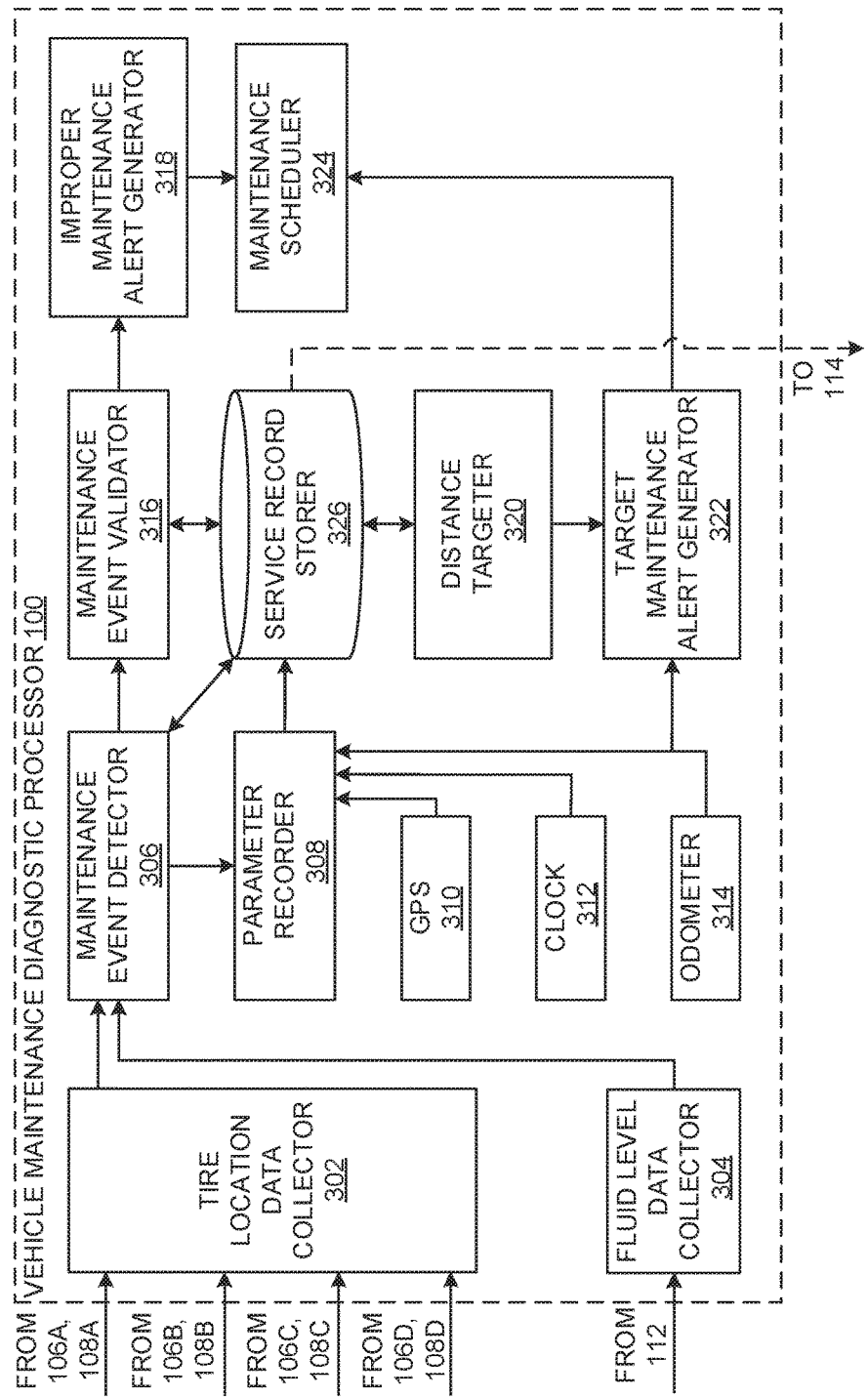
FIG. 3 is a block diagram further detailing the vehicle maintenance diagnostic processor of FIG. 1 by which the examples disclosed herein can be implemented.

FIG. 3 is a block diagram of an example implementation of the example vehicle maintenance diagnostic processor 100 of FIG. 1. The vehicle maintenance diagnostic processor 100 can, in some examples, include an example tire location data collector 302, an example fluid level data collector 304, an example maintenance event detector 306, an example parameter recorder 308, an example GPS (Global Positioning System) 310, an example clock 312, an example odometer 314, an example maintenance event validator 316, an example improper maintenance alert generator 318, an example distance targeter 320, an example target maintenance alert generator 322, an example maintenance scheduler 324, and an example service record storer 326.

The example tire location data collector 302, included or otherwise implemented by the vehicle maintenance diagnostic processor 100, is capable of receiving at least one of tire orientation data, tire angular rotation data, and TPMS sensor serial number data from the TPMS sensors 106A, 106B, 106C, and 106D, and wheel assembly angular rotation data from the wheel assembly rotation sensors 108A. 108B, 108C, and 108D. In some examples, the tire location data collector 302 is further to determine a location of the one or more tires 104A, 104B, 104C, and 104D based on the data received from the TPMS sensors 106 and the wheel assembly rotation sensors 108.

Further, the location of the one or more tires 104A, 104B, 104C, and 104D can be determined, in some examples, by monitoring the instantaneous orientation with respect to gravity data collected from the TPMS sensors 106A, 106B, 106C, and 106D and the wheel assembly angular rotation data acquired from wheel assembly rotation sensors 108A, 108B, 108C, and 108D over a predetermined period (e.g., 5 minutes, 1 mile, 10 turns of the tires 104, etc.). Monitoring the data further includes comparing the orientation data for the one or more TPMS sensors 106 with the angular rotation data from one or more of the wheel assembly rotation sensors 108. For example, when the vehicle 102 is turning, the displacement of each of the TPMS sensors 106 corresponds to the displacement of only one wheel assembly rotation sensor 108. This is a result of each tire 104 having a unique/differing angular rotational velocity from the other tires 104 when cornering. For example, when cornering, only one tire 104 (at one moment) may have had 720° of displacement. Therefore, the TPMS sensor 106 that had the same orientation (e.g. 30°) before and after 720° of angular displacement of the wheel assembly rotation sensor 108 is the TPMS sensor 106 corresponding to the wheel assembly rotation sensor 108 and therefore wheel assembly 107.

Figure 2:
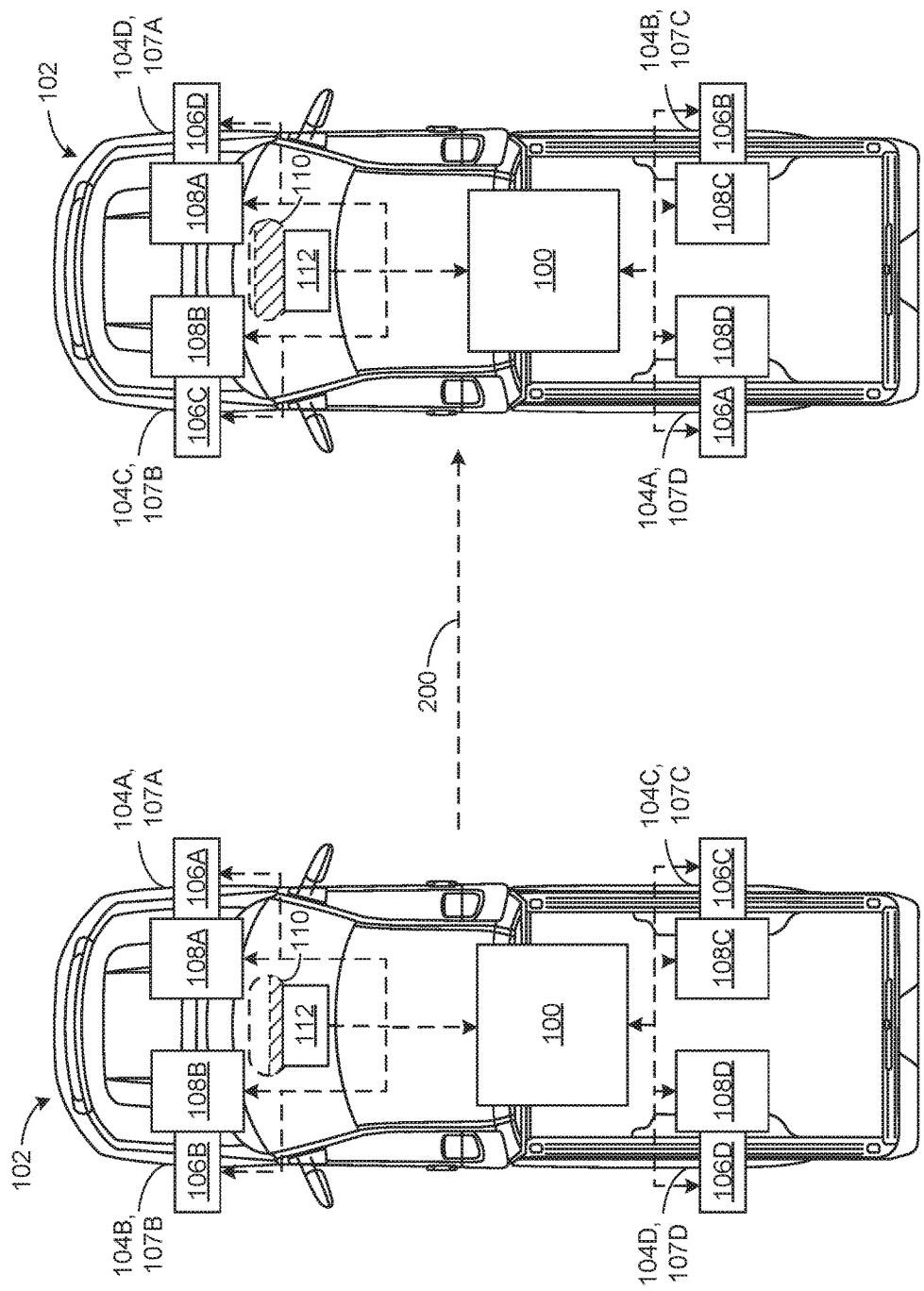
FIGS. 2A and 2B illustrate an example vehicle maintenance event completed on the vehicle of FIG. 1.

For example, in the example of FIG. 2B, the TPMS sensor 106A, identified by its unique serial number, and the wheel assembly rotation sensor 108D are in the BL position on the vehicle 102. Having determined the location of the TPMS sensor 106A, the tire location data collector 302 can further determine that the tire 104A, coupled to the TPMS sensor 106A, is in the BL position on the vehicle 102. In some examples, the position of each of the tires 104 is determined in this manner. For example, in the illustrated example of FIGS. 1 and 2, the position of each of the tires 104A, 104B, 104C, and 104D is determined in this manner. In some examples, the tire location data collector 302 can further distribute the position(s) of one or more of the tires 104 to the maintenance event detector 306. Additionally or alternatively, other algorithms to identify the positions of one or more TPMS sensors 106 on the vehicle 102 may be used.

The example fluid level data collector 304, included in or otherwise implemented by the vehicle maintenance diagnostic processor 100, is capable of receiving a level of the fluid 110 from the fluid level sensor 112. In some examples, the fluid 110 can be oil, windshield washer fluid, brake fluid, transmission fluid, or any other fluid utilized for operation of the vehicle 102. Further, the fluid level data collector 304 can receive a description of the fluid 110 for which the fluid level was determined by the fluid level sensor 112. In some examples, the fluid level data collector 304 can further distribute the fluid level and description of the fluid 110 to the maintenance event detector 306.

The example maintenance event detector 306, included in or otherwise implemented by the vehicle maintenance diagnostic processor 100, is capable of determining whether one or more maintenance events occurred for the vehicle 102 based on data received from at least one of the tire location data collector 302 and the fluid level data collector 304. In some examples, the maintenance event detector 306 can determine a tire rotation occurred based on one or more positions of the tires 104, received from the tire location data collector 302, differing from previously known positions of the tires 104 retrieved from the service record storer 326.

Additionally or alternatively, the maintenance event detector 306 can determine a fluid change occurred based on the level of the fluid 110, received from the fluid level data collector 304, differing from a previously known level of the fluid 110 retrieved from the service record storer 326 (e.g., a discrete change in the level of the fluid 10 is detected). Additionally or alternatively, for an example vehicle 102 where the fluid level sensor 112 functions when the vehicle 102 is turned off, the maintenance event detector 306 can determine the fluid change occurred based on the level of the fluid 110 changing from a first level to empty (e.g., 0% filled, 0 liters, 0 gallons, etc.). Additionally or alternatively, when the fluid change is an oil change, the maintenance event detector 306 can determine the oil change occurred based on detecting a slow-to-build oil pressure, which is a characteristic of an engine after at least one of an oil change and/or oil filter change.

In response to determining that at least one of a tire rotation and/or fluid change occurred, the maintenance event detector 306 is further to notify the example parameter recorder 308 of the maintenance event in addition to distributing information pertaining to the maintenance event (e.g., whether the maintenance event was a tire rotation or fluid change, a location of the one or more tires 104 after a tire rotation, a level of the fluid 110 after a fluid change, which fluid was changed after a fluid change, etc.) to at least one of the maintenance event validator 316 and the service record storer 326.

The example parameter recorder 308, included in or otherwise implemented by the vehicle maintenance diagnostic processor 100, is capable of, in response to receiving a notification from the maintenance event detector 306 that a maintenance event has occurred, retrieve data from at least one of the example GPS 310, the example clock 312, and the example odometer 314. The GPS 310, the clock 312, and the odometer 314, included in or otherwise implemented by the vehicle maintenance diagnostic processor 100, are capable of determining a location of the vehicle 102 (e.g., 49.845 degrees N, 47.567 degrees W), a date and time (e.g., 2/27/17, 4:56 PM CST), and a total distance traveled by the vehicle 102 (e.g., 46,768 miles), respectively. In some examples, the odometer 314 can further distribute the total distance traveled by the vehicle 102 to the target maintenance alert generator 322. Additionally, in some examples, the parameter recorder 308 can determine a service station (e.g., a repair shop, a dealership, an oil change shop, a car wash, etc.) by correlating the GPS based location of the vehicle 102 to a service station based upon service station locations known to a GPS mapping program.

The example maintenance event validator 316, included in or otherwise implemented by the vehicle maintenance diagnostic processor 100, is capable of validating that one or more maintenance events, performed on the vehicle 102, were performed correctly. In some examples, in response to the maintenance event detector 306 determining the maintenance event was a tire rotation, the maintenance event validator 316 is to validate that each of the tires 104 was rotated to a target position, the target positions of the tires 104 determined based on the previous location of each of the tires 104 and a targeted tire rotation schema retrieved from the service record storer 326. For example, if the previous locations of the tires 104 includes tire 104A in the FL, tire 104B in the FR, tire 104C in the BL, and tire 104D in the BR and the tire rotation schema is a crisscross tire rotation, the targeted positions of the tires 104 include tire 104A in the BR, tire 104B in the BL, tire 104C in the FR, and tire 104D in the FL.

In response to determining each of the current positions of the tires 104 matches the targeted positions of the tires 104, the maintenance event validator 316 distributes a rotation valid flag to at least one of the improper maintenance alert generator 318 and the service record storer 326. Alternatively, in response to determining one or more of the current positions of the tires 104 does not match the targeted positions of the tires 104, the maintenance event validator 316 distributes a rotation invalid flag to at least one of the improper maintenance alert generator 318 and the service record storer 326 along with an identifier of the one or more tires 104 (e.g., at least one of tire 104A, 104B. 104C, or 104D) that were not rotated to the targeted position.

Alternatively, in response to the maintenance event detector 306 determining the maintenance event was a fluid change, the maintenance event validator 316 is to validate that the fluid 110 was filled to a target level (e.g., 75% filled, 4 inches, 3 liters, etc.) within a tolerance (e.g., +/−5%, +/−0.25 inches, +/−0.1 liters, etc.), where the target level of the fluid 110 and the tolerance about the target level can be retrieved from the service record storer 326. In some examples, determining that the fluid 110 was filled within a tolerance of the target level of the fluid 110 further includes determining if the fluid 110 is within the range specified by the target level of the fluid 110 and the tolerance about the target level. For example, 3.95 liters is within a range specified as 4 liters +/−0.1 liters. Similarly, 3.7 liters is not within a range specified as 4 liters +/−0.1 liters.

In response to determining the level of the fluid 110 is within the range specified by the target level of the fluid 110 and the tolerance about the target level, the maintenance event validator 316 distributes a fluid change valid flag to at least one of the improper maintenance alert generator 318 and the service record storer 326. Alternatively, in response to determining the level of the fluid 110 is not within the range specified by the targeted level of the fluid 110 and the tolerance about the targeted level, the maintenance event validator 316 distributes a fluid change invalid flag to at least one of the improper maintenance alert generator 318 and the service record storer 326 along with an identifier of the fluid 10 (e.g., oil, brake fluid, transmission fluid, windshield washer fluid, etc.) and a level of the fluid 110.

The example improper maintenance alert generator 318, included in or otherwise implemented by the vehicle maintenance diagnostic processor 100, is capable of generating an alert in response to receiving an invalid maintenance flag from the maintenance event validator 316. In some examples, the improper maintenance alert generator 318 is to generate an alert for distribution to a display, an audio system, or other device capable of notifying a user of the vehicle 102.

In some examples, the alert generated can include a notification that the fluid 110 was not filled to a target level. Additionally or alternatively, the alert generated can include a fluid level suggestion to correct the level of the fluid 110. Additionally or alternatively, the alert generated can include a notification that one or more tires 104 were improperly rotated. Additionally or alternatively, the alert generated can include a list of the one or more tires 104 that were rotated to an improper position. Additionally or alternatively, the alert generated can include a tire rotation suggestion to correct the improper tire rotation. Additionally or alternatively, the alert generated can further distribute a maintenance required flag to the example maintenance scheduler 324.

The example distance targeter 320, included in or otherwise implemented by the vehicle maintenance diagnostic processor 100, is capable of determining a targeted (e.g., recommended) distance for a future maintenance event to occur. In some examples, when determining a targeted distance for a future tire rotation, the distance targeter 320 is to retrieve one or more tire rotation service records from the service record storer 326. The distance targeter 320 can further utilize the tire rotation service records retrieved to determine the total distance the vehicle 102 has traveled on at least one of the first and second tire rotation configurations. In some examples, determining the total distance the vehicle 102 has traveled on at least one of the first and second tire rotation configurations further includes summing the distance traveled for one or more periods that the vehicle 102 was utilizing the first tire rotation configuration and summing the distance traveled for one or more periods that the vehicle 102 was utilizing the second tire rotation configuration, respectively.

In some examples, determining the vehicle distance for the next tire rotation to balance (e.g., equalize) the distance traveled on the first and second tire configurations further includes determining a difference between the total distance traveled on the first tire configuration (e.g., the cumulative distance the vehicle 102 traveled for one or more periods utilizing the first tire configuration) and the total distance traveled on the second tire configuration (e.g., the cumulative distance the vehicle 102 traveled for one or more periods utilizing the second tire configuration). For example, when the vehicle has traveled a cumulative distance of 38,000 miles on the first tire configuration and a cumulative distance of 41,000 miles on the second tire configuration, the difference is 3,000 miles. Similarly, when the total distance the vehicle has traveled on the first tire configuration is less than the total distance traveled on the second configuration, the difference value would be negative (e.g., −3,000 miles, −1,500 miles, etc.). Upon calculating the difference, the distance targeter 320 can further add the difference value to a manufacturer specified recommended (e.g., targeted) rotation distance. For example, if the difference value is 3,000 miles and the manufacturer recommended (e.g., targeted) distance is 10,000 miles, the distance targeter 320 may target a tire rotation 13,000 miles from the current odometer 314 distance. Similarly, if the difference value is −1,500 miles and the manufacturer recommended (e.g., targeted) distance is 10,000 miles, the distance targeter 320 may target a tire rotation 8,500 miles from the current odometer 314 distance. In some examples, the distance targeter 320 can further distribute the targeted distance for the tire rotation to at least one of the target maintenance alert generator 322 and the service record storer 326.

In some examples, when determining a targeted distance for a future fluid change, the distance targeter 320 is to retrieve one or more fluid change service records from the service record storer 326. Further, the distance targeter 320 can determine the targeted distance based upon a maintenance schedule for the vehicle 102. In some examples, this further includes adding a target distance between fluid change events to a vehicle distance at the previous fluid change event, each retrieved form the service record storer 326. For example, if an oil change occurred at an odometer 314 reading of 3,000 miles and the targeted travel distance between oil changes is 8,000 miles, the distance targeter 320 will target 11,000 miles (i.e., an odometer 314 reading) for a second oil change. In some examples, the distance targeter 320 can further distribute the targeted distance for the fluid change to at least one of the target maintenance alert generator 322 and the service record storer 326.

The example target maintenance alert generator 322, included in or otherwise implemented by the vehicle maintenance diagnostic processor 100, is capable of generating an alert when targeted (e.g., required or recommended) maintenance is either required soon (e.g., within 1 week, within 500 miles, within 1,000 miles, etc.) or is past due. In some examples, this can further include determining a buffer distance before maintenance is targeted (e.g., a certain distance until a maintenance event is required) at which a user of the vehicle 102 is to be alerted regarding the upcoming maintenance event. The target maintenance alert generator 322 is further to utilize the buffer distance calculated in addition to the targeted maintenance distance calculated by the distance targeter 320 to determine a vehicle alert distance to alert the user of the vehicle 102 to the upcoming maintenance event. In some examples, determining the vehicle alert distance to alert the user further includes subtracting the buffer distance from the targeted maintenance distance.

The target maintenance alert generator 322 can further retrieve the current vehicle distance from the odometer 314. Utilizing this value, the target maintenance alert generator 322 determines whether the current vehicle distance retrieved from the odometer 314 is greater than the vehicle alert distance.

In response to the current vehicle distance (e.g., the odometer 314 distance) being greater than or equal to the vehicle alert distance, the target maintenance alert generator 322 can generate an alert for distribution to a display, an audio system, or other device capable of notifying a user of the vehicle 102. In some examples, the alert can include a vehicle distance (e.g., the odometer 314 distance) at which maintenance is required. Additionally or alternatively, the alert can include a distance until maintenance is required (e.g., the odometer 314 distance subtracted from the vehicle alert distance).

Alternatively, in response to the current vehicle distance (e.g., the odometer 314 distance) being less than the vehicle alert distance, the vehicle 102 continues normal operation and no further action is completed by the target maintenance alert generator 322.

The example maintenance scheduler 324, included in or otherwise implemented by the vehicle maintenance diagnostic processor 100, is capable of suggesting a service station and a time to schedule maintenance to refill the fluid 110 to the targeted level and/or to rotate the tires 104 to targeted locations. In some examples, the maintenance scheduler 324 can further schedule a maintenance event at the suggested service station and the suggested time in response to a user of the vehicle 102 accepting the suggested service station and time. In some examples, the maintenance scheduler 324 can further suggest a service station and a time for scheduled maintenance based on at least one of a schedule (e.g., calendar) of the user of the vehicle 102 and a schedule (e.g., calendar) of one or more service stations.

Additionally or alternatively, the maintenance scheduler 324 can suggest a service station and a time based on distances to one or more nearby service stations. Additionally or alternatively, the maintenance scheduler 324 can suggest a service station and a time based on one or more reviews of one or more nearby service stations. Additionally or alternatively, the maintenance scheduler 324 can suggest a service station and a time based on a preference to have service completed at a dealership instead of a maintenance shop or vice versa. Additionally or alternatively, the maintenance scheduler can suggest a service station based on a user defined preference.

In some examples, if the vehicle 102 is a self-driving (e.g., autonomous) vehicle, the maintenance scheduler 324 can suggest a service station and a time based on a location and time the car is expected to be parked. For example, if a calendar of the user of the vehicle 102 shows the user is at work from 9:00 AM until 5:00 PM on Tuesdays, the maintenance scheduler can suggest a service station near the user's work location and at a time in the range specified by the user's work schedule (e.g., sometime between 9:00 AM and 5:00 PM). Further, in response to the user accepting the suggested service station and time (for example, Bob's Auto Service, which is 4 miles from the user's work location, at 1:00 PM), the maintenance scheduler 324 can further accept the service station and time for the maintenance event and the vehicle 102 can self-drive to and from the maintenance event. In such examples, the vehicle maintenance diagnostic processor 100 will detect and record data in the same manner as if a user of the vehicle 102 drove to and from the selected service station.

The example service record storer 326, as illustrated in FIG. 3, is capable of storing service information for at least one of one or more tire rotation maintenance events and/or one or more fluid change maintenance events. In some examples, service information can further include at least one of a previous tire rotation configuration, a current tire rotation configuration, a fluid changed description, a validity check of the maintenance event, a location and/or service station which completed the maintenance event, a vehicle distance (e.g., odometer 314 distance) at the maintenance event, a time of the maintenance event, a distance since the previous maintenance event, a total distance on a given tire rotation configuration, and a targeted distance for the next maintenance event. In some examples, the service record storer 326 can store the service records in data tables. For example, the service record storer 326 can store the service records in at least one of a service log 400 and a service log 500, illustrated in FIGS. 4 and 5, respectively. In some examples, the service record storer 326 can further distribute one or more service records, for example the service log 400 and/or the service log 500, to the vehicle maintenance database 116 via the network 114.

Additionally or alternatively, the example service record storer 326 can store at least one targeted distance between tire rotations, one or more targeted tire rotation configurations (e.g., crisscross, rearward cross, frontward cross, front to back, side to side, etc.), one or more targeted distances between fluid changes (e.g., targeted distance between oil changes, brake fluid changes, windshield washer fluid changes, transmission fluid changes, etc.), and one or more targeted fluid levels.

The service record storer 326 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The service record storer 326 may additionally or alternatively be implemented by one or more double data rate (DDR) memories, such as DDR, DDR2, DDR3, DDR4, mobile DDR (mDDR), etc. The service record storer 326 may additionally or alternatively be implemented by one or more mass storage devices such as hard disk drive(s), compact disk drive(s), digital versatile disk drive(s), etc. While in the illustrated example the service record storer 326 is illustrated as a single database, the service record storer 326 may be implemented by any number and/or type(s) of databases. Furthermore, the data stored in the service record storer 326 may be in any data format such as, for example, binary data, comma delimited data, tab delimited data, structured query language (SQL) structures, etc.

FIG. 4 illustrates an example service log 400 for tire rotation maintenance events as generated by the vehicle maintenance diagnostic processor 100 and further stored in the service record storer 326. The service log 400, which can in some examples be implemented as a data table, includes one or more previous tire configurations 402A, one or more new tire configurations 402B, one or more validity checks 404, one or more vehicle locations 406, one or more vehicle distances 408, one or more times and dates 410, one or more total configuration distances 412, and one or more targeted tire rotation distances 414. Further, the example service log 400 includes one or more tire rotation service records 416, 418, 420, 422, and 424. In the example of FIG. 4, the manufacturer suggested distance between tire rotations for the vehicle 102 is 9,000 miles.

For example, tire rotation service record 416 shows that the tires 104 of the vehicle 102 were rotated from configuration 1 to configuration 2 and it was a valid rotation. Additionally, the rotation was completed at Bob's Auto Service in Detroit, Mich. on 9/24/16 at 4:52 PM and there was 9,000 miles on the vehicle 102 at the time of rotation. As this was the first tire rotation completed for the vehicle 102, the total distance traveled on configuration 1 is 9,000 miles. In order to balance the distance traveled on configuration 1 and configuration 2, the distance targeter 320 determines the next tire rotation should be completed at a vehicle distance of 18,000 miles (i.e., the vehicle 102 travels 9,000 miles on configuration 2, thus balancing the distance traveled on configuration 1 and 2).

Additionally, tire rotation service record 418 shows that the tires 104 of the vehicle 102 were rotated from configuration 2 to configuration 1 and it was a valid rotation. Additionally, the rotation was completed at Bill's Tire Change in Chicago, Ill. on Nov. 12, 2016 at 8:30 AM and there was 19,500 miles on the vehicle 102 at the time of rotation. Following this tire rotation, the total distance traveled on configuration 2 is 10,500 miles. In order to balance the distance traveled on configuration 1 and configuration 2, the distance targeter 320 determines the next tire rotation should be completed at a vehicle distance of 30,000 miles (i.e., the vehicle 102 travels 10,500 miles on configuration 1, thus balancing the distance traveled on configuration 1 and 2).

Additionally, tire rotation service record 420 shows that the tires 104 of the vehicle 102 were rotated from configuration 1 to configuration 2 and it was a valid rotation. Additionally, the rotation was completed at Tire Rotation Services in Milwaukee, Wis. on Jan. 1, 2017 at 12:30 PM and there was 29,000 miles on the vehicle 102 at the time of rotation. Following this tire rotation, the total distance traveled on configuration 1 is 18,500 miles. In order to balance the distance traveled on configuration 1 and configuration 2, the distance targeter 320 determines the next tire rotation should be completed at a vehicle distance of 37,000 miles (i.e., the vehicle 102 travels 8,000 miles on configuration 2, thus balancing the distance traveled on configuration 1 and 2).

Additionally, tire rotation service record 422 shows that the tires 104 of the vehicle 102 were rotated from configuration 2 to configuration 1 and it was a valid rotation. Additionally, the rotation was completed at Bill's Tire Change in Chicago, Ill. on Feb. 27, 2017 at 6:00 PM and there was 37,000 miles on the vehicle 102 at the time of rotation. Following this tire rotation, the total distance traveled on configuration 2 is 18,500 miles. As the distance traveled on configuration 1 and configuration 2 is currently balanced, the distance targeter 320 determines the next tire rotation should be completed at the manufacture suggested distance between rotations, 9,000 miles in the illustrated example, and determines a rotation should be completed at a vehicle distance of 46,000 miles.

Additionally, tire rotation service record 424 shows that the tires 104 of the vehicle 102 were rotated from configuration 1 to configuration X (e.g., neither of configuration 1 or configuration 2) and it was an invalid rotation. Additionally, the rotation was completed at Bob's Auto Service in Detroit, Mich. on Jul. 8, 2017 at 11:00 AM and there was 46,500 miles on the vehicle at the time of rotation. Following this tire rotation, the total distance traveled on configuration 1 is 28,000 miles. However, because the rotation was incorrectly completed, the distance targeter 320 is to target the improper tire rotation to be corrected as soon as possible. As such, in the illustrated example, the distance targeter 320 targets the next tire rotation be completed at a vehicle distance of 46,500 miles.

FIG. 5 illustrates an example service log 500 for fluid change maintenance events as generated by the vehicle maintenance diagnostic processor 100 and further stored in the service record storer 326. The service log 500, which can in some examples be implemented as a data table, includes one or more fluid change descriptions 502, one or more validity checks 504, one or more vehicle locations 506, one or more vehicle distances 508, one or more times and dates 510, one or more distances since previous change 512, and one or more targeted next fluid change distances 514. Further, the example service log 500 includes one or more fluid change service records 516, 518, 520, and 522.

For example, fluid change service record 516 shows that the fluid 110 that was changed was brake fluid and it was a valid fluid change. Additionally, the fluid change was completed at Bob's Auto Service in Detroit, Mich. on Aug. 22, 2016 at 2:54 PM and there was 8,500 miles on the vehicle 102 at the time of the fluid change. As this was the first brake fluid change performed on the vehicle 102, the distance since the previous change is 8,500 miles. Additionally, the manufacturer recommended (e.g., targeted) distance between brake fluid changes is 40,000 miles. As such, the targeted distance for the next brake fluid change is 48,500 miles.

Additionally, fluid change service record 518 shows that the fluid 110 that was changed was oil and it was a valid fluid change. Additionally, the fluid change was completed at Tim's Oil Change in Chicago, Ill. on Dec. 5, 2016 at 10:35 AM and there was 19,000 miles on the vehicle 102 at the time of the fluid change. As this was the first oil change performed on the vehicle 102, the distance since the previous change is 19,000 miles. Additionally, the manufacturer recommended (e.g., targeted) distance between oil changes is 20,000 miles. As such, the targeted distance for the next oil change is 39,000 miles.

Additionally, fluid change service record 520 shows that the fluid 110 that was changed was coolant and it was a valid fluid change. Additionally, the fluid change was completed at Fluid Change Services in Milwaukee, Wis. on Jan. 24, 2017 at 2:17 PM and there was 29,000 miles on the vehicle 102 at the time of the fluid change. As this was the first coolant change performed on the vehicle 102, the distance since the previous change is 29,000) miles. Additionally, the manufacturer recommended (e.g., targeted) distance between coolant changes is 35,000 miles. As such, the targeted distance for the next coolant change is 64,000 miles.

Additionally, fluid change service record 522 shows that the fluid 110 that was changed was oil. However, the fluid change was invalid (i.e., too much oil or not enough oil was added to the vehicle 102 following the fluid change). Additionally, the fluid change was completed at Tim's Oil Change in Chicago, Ill. on Mar. 6, 2017 at 7:05 PM and there was 38,500 miles on the vehicle 102 (500 miles less than the targeted next fluid change distance 514 determine by fluid change service record 518) at the time of the fluid change. As the previous oil change on the vehicle 102 was completed at 19,000 miles, the distance since the previous change is 19,500 miles. However, since the fluid change was incorrectly completed, the distance targeter 320 is to target the improper fluid change be corrected as soon as possible. As such, in the illustrated example, the distance targeter 320 targets the next oil change be completed at a vehicle distance of 38.500 miles.

While an example manner of implementing the vehicle maintenance diagnostic processor 100 of FIG. 1 is illustrated in FIG. 3, one or more of the elements, processes and/or devices illustrated in FIG. 3 may be combined, divided, re-arranged, omitted, eliminated and/or implemented in any other way. Further, the example tire location data collector 302, the example fluid level data collector 304, the example maintenance event detector 306, the example parameter recorder 308, the example GPS 310, the example clock 312, the example odometer 314, the example maintenance event validator 316, the example improper maintenance alert generator 318, the example distance targeter 320, the example target maintenance alert generator 322, the example maintenance scheduler 324, the example service record storer 326, and/or, more generally, the example vehicle maintenance diagnostic processor 100 of FIG. 3 may be implemented by hardware, software, firmware and/or any combination of hardware, software and/or firmware. Thus, for example, any of the example tire location data collector 302, the example fluid level data collector 304, the example maintenance event detector 306, the example parameter recorder 308, the example GPS 310, the example clock 312, the example odometer 314, the example maintenance event validator 316, the example improper maintenance alert generator 318, the example distance targeter 320, the example target maintenance alert generator 322, the example maintenance scheduler 324, the example service record storer 326, and/or, more generally, the example vehicle maintenance diagnostic processor 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example tire location data collector 302, the example fluid level data collector 304, the example maintenance event detector 306, the example parameter recorder 308, the example GPS 310, the example clock 312, the example odometer 314, the example maintenance event validator 316, the example improper maintenance alert generator 318, the example distance targeter 320, the example target maintenance alert generator 322, the example maintenance scheduler 324, and/or the example service record storer 326 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vehicle maintenance diagnostic processor 100 of FIG. 3 may include one or more elements, processes and/or devices in addition to, or instead of, those illustrated in FIG. 3, and/or may include more than one of any or all of the illustrated elements, processes and devices.

Flowcharts representative of example methods for implementing the vehicle maintenance diagnostic processor 100 of FIG. 1 are shown in FIGS. 6-10. In these examples, the method(s) may be implemented using machine readable instructions comprising a program for execution by a processor such as the processor 1112 shown in the example processor platform 1100 discussed below in connection with FIG. 11. The program may be embodied in software stored on a non-transitory computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 6-10, many other methods of implementing the example vehicle maintenance diagnostic processor 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 6-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 6:
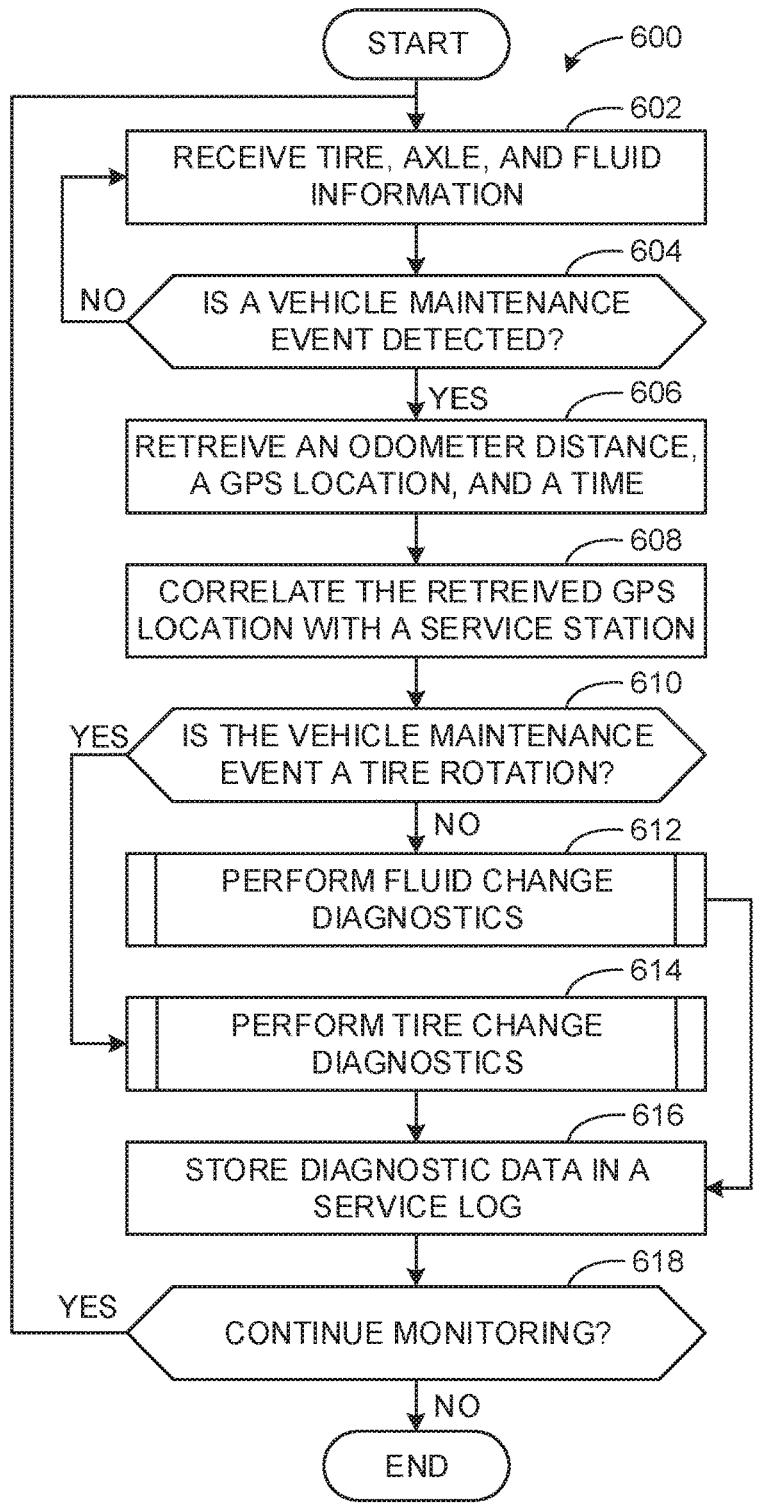
FIGS. 6-10 are flowcharts representative of example methods that may be performed using the vehicle maintenance diagnostic processor of FIG. 1 to detect and/or record information pertaining to the vehicle maintenance event.

The example method 600 of FIG. 6 begins at block 602. At block 602, the example tire location data collector 302 receives tire information (e.g., tire pressures, tire temperatures, tire orientation, tire rotation, TPMS sensor serial number, etc.) from the TPMS sensors 106A, 106B, 106C, and 106D and wheel assembly information (e.g., wheel assembly rotation, etc.) from the wheel assembly rotation sensors 108A, 108B, 108C, and 108D. Additionally at block 602, the example fluid level data collector 304 receives fluid level information (e.g., 50% full, 25% empty, 4 liters, 3 gallons, etc.) from the fluid level sensor 112. Further, at block 602, the tire location data collector 302 and the fluid level data collector 304 can distribute received information to the example maintenance event detector 306.

At block 604, the maintenance event detector 306 utilizes the information received at block 602 to determine if a vehicle maintenance event occurred. For example, in response to determining one or more tires 104 of the vehicle 102 changed locations based on information collected from the TPMS sensors 106A, 106B, 106C, and 106D and the wheel assembly rotation sensors 108A, 108B, 108C, and 108D, the maintenance event detector 306 determines a tire rotation event occurred. Additionally or alternatively, in response to determining a level of the fluid 110 changed from a first level to a second level based on information collected from the fluid level sensor 112, the maintenance event detector 306 determines a fluid change event occurred. In response to at least one of a tire rotation event and/or a fluid change event occurring, processing transfers to block 606. Alternatively, in response to neither of a tire rotation event or fluid change event occurring, processing returns to block 602.

At block 606, the maintenance event detector 306 notifies the parameter recorder 308 of the detection. In response to the notification, the parameter recorder 308 is to retrieve at least one of a location of the vehicle 102 at the time of the vehicle maintenance event from the GPS 310, a time at which the maintenance event was completed from the clock 312 and a total vehicle travel distance at the time of the vehicle maintenance event from the odometer 314.

At block 608, the parameter recorder 308 is further to, utilizing the location of the vehicle 102 retrieved at block 606, determine a service station (e.g., a repair shop, a dealership, an oil change shop, a car wash, etc.) by correlating the GPS based location of the vehicle 102 to the service station based upon service station locations known to a GPS mapping program. For example, if the GPS location of the vehicle 102 at the time of the maintenance event is 42.338 N, −88.661 E and the nearest service location is Bob's Tire Rotation Services at 42.339 N, −88.660 E, the parameter recorder 308 can determine that the maintenance event was completed at Bob's Tire Rotation Services.

At block 610, the maintenance event detector 306 is to determine whether the maintenance event detected at block 604 is a tire rotation. In response to determining the maintenance event is not a tire rotation (e.g., the maintenance event is a fluid change), processing transfers to block 612. Alternatively, in response to determining the maintenance event is a tire rotation, processing transfers to block 614.

Figure 7:
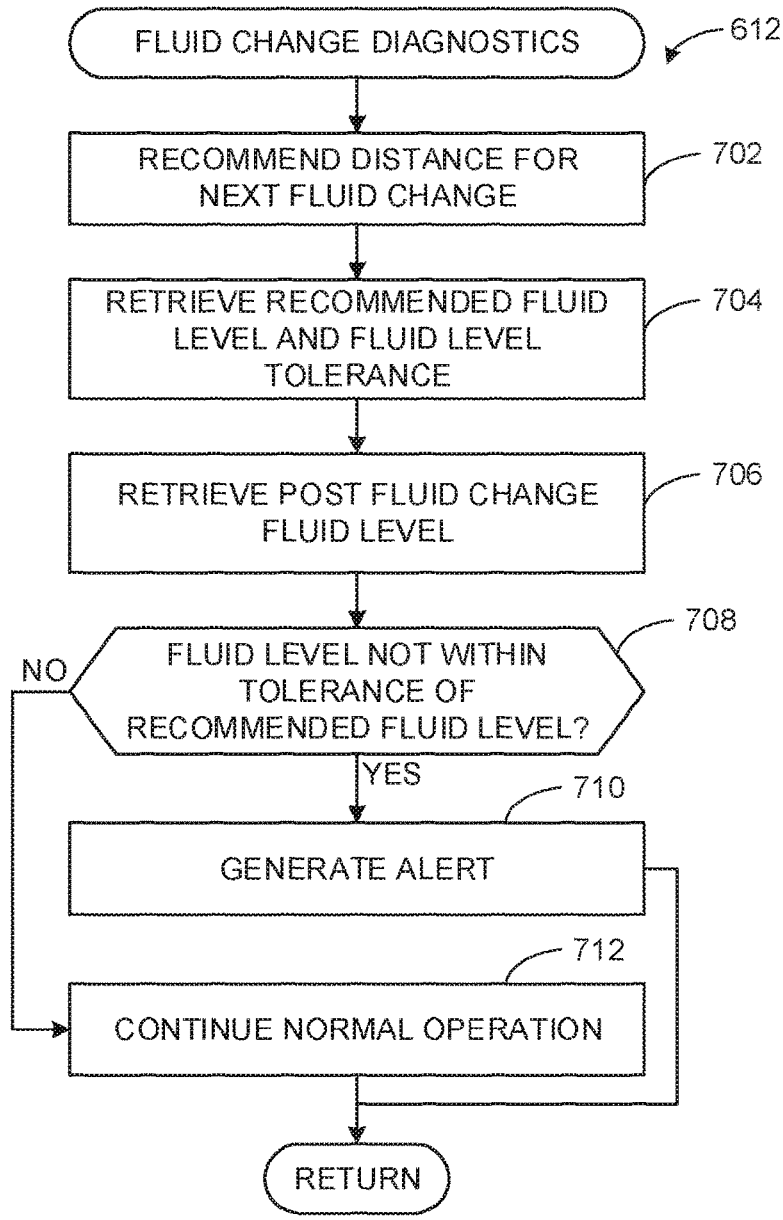

At block 612, described in further detail in conjunction with FIG. 7 and in response to determining the vehicle maintenance event is a fluid change, the vehicle maintenance diagnostic processor 100 is to perform a full diagnostic routine for a fluid change event. Similarly, at block 614, described in further detail in conjunction with FIG. 8 and in response to determining the vehicle maintenance event is a tire rotation event, the vehicle maintenance diagnostic processor 100 is to perform a full diagnostic routine for a tire rotation event. In response to completing at least one of block 612 and block 614, processing transfers to block 616.

At block 616, at least one of the parameter recorder 308, the maintenance event validator 316, and the distance targeter 320 distribute diagnostic information to the service record storer 326 for storage. In some examples, the diagnostic information stored in the service record storer 326 can include at least one of the GPS location for the maintenance event, the service station for the maintenance event, a date and time of the maintenance event, a vehicle travel distance at the time of the maintenance event, the tire configuration after the maintenance event, the fluid level after the maintenance event, a validity flag for the maintenance event, and a targeted distance for a future maintenance event.

At block 618, the vehicle maintenance diagnostic processor 100 determines whether is it is desired to continue monitoring for vehicle maintenance diagnostics. In some examples, vehicle maintenance diagnostics are continually monitored. Additionally or alternatively, vehicle maintenance diagnostics are monitored as long as the vehicle 102 is in motion. Additionally or alternatively, vehicle maintenance diagnostics are monitored based on a schedule determined by a computer utilizing at least one of a predetermined schedule and/or a dynamically updating schedule based upon one or more parameters of the vehicle 102. In response to determining it is desired to continue monitoring vehicle maintenance diagnostics, processing returns to block 602 of the example method 600. Alternatively, in response to determining it is no longer desired to continue monitoring vehicle maintenance diagnostics, the example method 600 of FIG. 6 ends.

An example method that may be executed to perform fluid change diagnostics (FIG. 6, block 612), the diagnostics performed in response to detecting a fluid change, is illustrated in FIG. 7. With reference to the preceding figures and associated descriptions, the example method of FIG. 7 begins execution at block 702 at which the distance targeter 320 determines a targeted distance for a second fluid change. In some examples, the distance targeter 320 can determine the targeted distance based upon a maintenance schedule for the vehicle 102. For example, if an oil change occurred at 3,000 miles and the targeted travel distance between oil changes is 8,000 miles, the distance targeter 320 will target 11,000 miles for a second oil change.

At block 704, the maintenance event validator 316 is to retrieve at least one of a targeted fluid fill level and a fluid fill level tolerance for the fluid 110 from the service record storer 326. At block 706, the maintenance event validator 316 is further to retrieve the current fluid fill level, previously acquired from the fluid level sensor 112, from the service record storer 326.

At block 708, the maintenance event validator 316 utilizes at least one of the targeted fluid fill level, the fluid fill level tolerance, and the current fluid fill level to determine if the most recent fluid change was valid. In some examples, determining if the most recent fluid change was valid can further include calculating the difference between the current fluid fill level from the targeted fluid fill level and determining if the resulting value is less than the fluid fill level tolerance. For example, if the current fluid fill level is 4 inches, the targeted fluid fill level is 4.5 inches, and the fluid fill level tolerance is +/−1 inch, the difference is 0.5 inches, which is less than 1 inch, hence the fluid change was valid. In response to determining the fluid 110 was not filled to within the tolerance of the targeted level, processing transfers to block 710. Alternatively, in response to determining the fluid 110 was filled to the targeted level, processing transfers to block 712.

At block 710, in response to determining the fluid 110 was not filled to within the tolerance of the targeted level, the improper maintenance alert generator 318 is to generate an alert for distribution to a display, an audio system, or other device capable of notifying a user of the vehicle 102.

At block 712, in response to determining the level of the fluid 110 is within a targeted tolerance, the vehicle 102 continues normal operation and the improper maintenance alert generator 318 does not generate an alert. After completion of at least one of block 710 or block 712, the example method of FIG. 7 ends and processing returns to block 616 of the example method 600 of FIG. 6.

Figure 8:
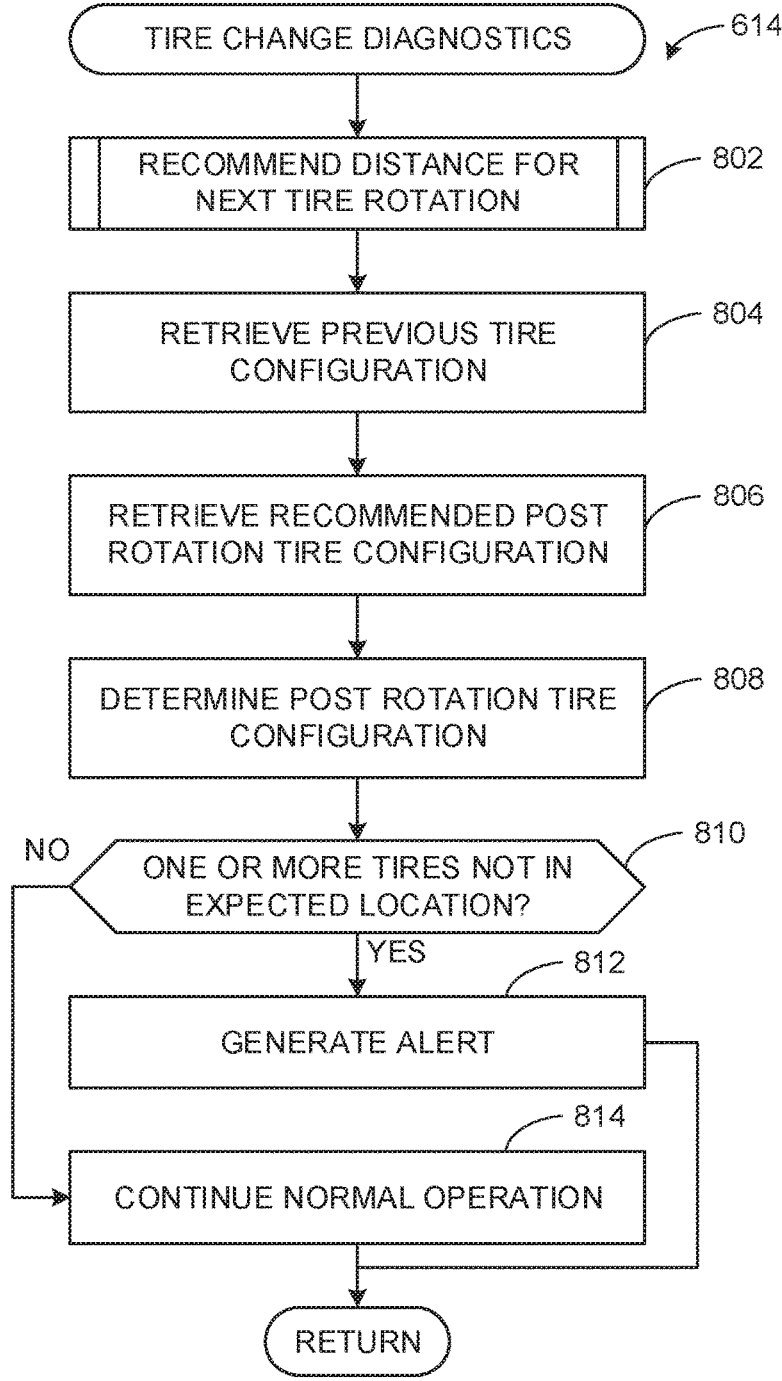

An example method that may be executed to perform tire rotation diagnostics (FIG. 6, block 614), the diagnostics performed in response to detecting a tire rotation, is illustrated in FIG. 8. With reference to the preceding figures and associated descriptions, the example method of FIG. 8 begins execution at block 802, described in further detail in conjunction with FIG. 9, at which the distance targeter 320 determines a distance at which the next tire rotation event is targeted.

Upon determining the distance targeted for the next tire rotation event, processing transfers to block 804. At block 804, the maintenance event validator 316 retrieves the previous tire rotation configuration from the service record storer 326. In some examples, the previous configuration retrieved can be one of the first tire configuration or the second tire configuration. At block 806, the maintenance event validator 316 is further to retrieve a targeted post rotation tire configuration from the service record storer 326. In some examples, the targeted post rotation tire configuration will be the configuration opposite of the previous tire rotation configuration determined at block 804. For example, if the previous configuration was the first configuration, the targeted post rotation configuration will be the second configuration. Similarly, if the previous configuration was the second configuration, the targeted post rotation configuration will be the first configuration.

At block 808, the maintenance event validator 316 is to determine the post tire rotation tire configuration. In some examples, determining the post rotation tire configuration further includes determining a current location of the one or more tires 104 of the vehicle 102 utilizing the one or more TPMS sensors 106 in conjunction with the one or more wheel assembly rotation sensors 108.

At block 810, the maintenance event validator 316 utilizes the targeted post tire configuration retrieved at block 806 and the current location of the one or more tires 104 determined at block 808 to determine if the most recent tire rotation was valid. In some examples, determining if the most recent tire rotation was valid further includes determining whether current locations of the one or more tires 104 matches the location suggested by the targeted post tire configuration. In response to determining one or more tires 104 are not in the targeted location, processing transfers to block 812. Alternatively, in response to determining each of the tires 104 is in the targeted location, processing transfers to block 814.

At block 812, in response to determining one or more tires 104 are not in the targeted location, the improper maintenance alert generator 318 is to generate an alert for distribution to a display, an audio system, or other device capable of notifying a user of the vehicle 102. In some examples, the alert generated can include a notification that one or more tires 104 were improperly rotated. Additionally or alternatively, the alert generated can include a list of the one or more tires 104 that were rotated to an improper position.

At block 814, in response to determining each of the tires 104 is in the targeted location, the vehicle 102 continues normal operation and the improper maintenance alert generator 318 does not generate an alert. After completion of at least one of block 812 or block 814, the example method of FIG. 8 ends and processing returns to block 616 of the example method 600 of FIG. 6.

Figure 9:
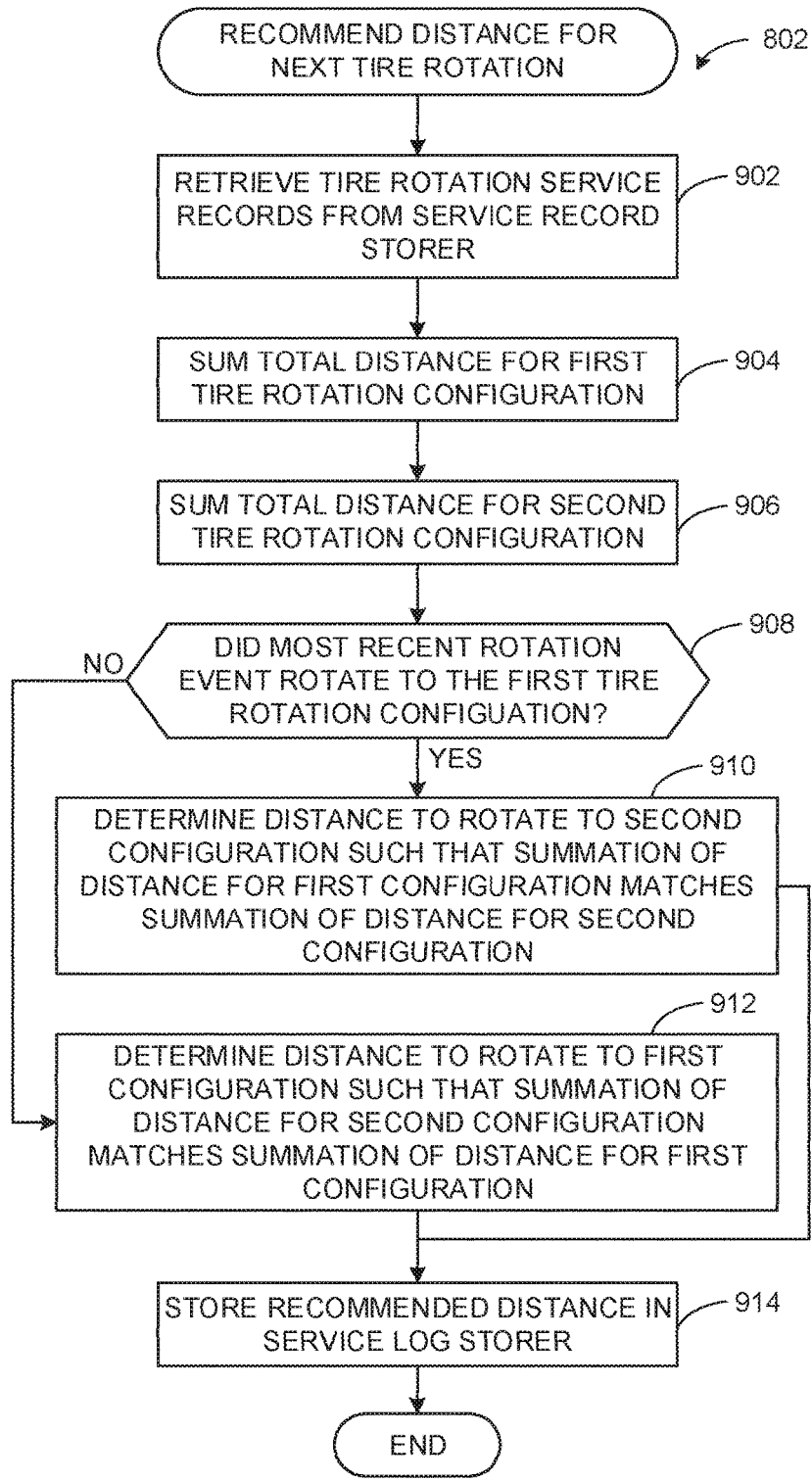

An example method that may be executed to target a distance for a next tire rotation (FIG. 8, block 802) is illustrated in FIG. 9. While the example method illustrated in FIG. 9 describes the vehicle 102 utilizing two (2) tire rotation configurations, the examples disclosed herein can function with any number of tire rotation configurations (e.g., tire position configurations). With reference to the preceding figures and associated descriptions, the example method of FIG. 9 begins execution at block 902 at which the distance targeter 320 retrieves one or more tire rotation service records from the service record storer 326.

At block 904, utilizing the tire rotation service records retrieved at block 902, the distance targeter 320 determines the total distance the vehicle 102 has traveled on the first tire rotation configuration. In some examples, determining the total distance the vehicle 102 has traveled on the first tire rotation configuration further includes summing the distance traveled for one or more periods that the vehicle 102 was utilizing the first tire rotation configuration.

At block 906, utilizing the tire rotation service records retrieved at block 902, the distance targeter 320 determines the total distance the vehicle 102 has traveled on the second tire rotation configuration. In some examples, determining the total distance the vehicle 102 has traveled on the second tire rotation configuration further includes summing the distance traveled for one or more periods that the vehicle 102 was utilizing the second tire rotation configuration. Alternatively, determining the total distance the vehicle 102 has traveled on the second tire rotation configuration can further include subtracting the distance the vehicle 102 has traveled on the first tire rotation configuration, determined at block 904, from the total distance the vehicle 102 has traveled.

At block 908, the distance targeter 320 uses the service records retrieved at block 902 to determine whether the most recent tire rotation event rotated to the first tire configuration or the second tire configuration (e.g., whether the current tire configuration is the first or second tire configuration). In response to determining the most recent rotation rotated to the first tire configuration, processing transfers to block 910. Alternatively, in response to determining the most recent rotation rotated to the second rotation configuration, processing transfers to block 912.

At block 910, in response to determining the current tire configuration is the first tire configuration, the distance targeter 320 is further to determine a vehicle distance to rotate from the first tire configuration to the second tire configuration such that the total distance on the first tire configuration matches the total distance on the second tire configuration.

In some examples, determining the vehicle distance for the next tire rotation to balance (e.g., equalize) the distance traveled on the first and second tire configuration further includes determining a difference between the total distance traveled on the first tire configuration determined at block 902 and the total distance traveled on the second tire configuration determined at block 904. Upon calculating the difference, the distance targeter 320 is further to add the difference value to a manufacturer specified recommended (e.g., targeted) rotation distance and a distance at a previous tire rotation. In some examples, the value from this summation is the targeted distance for the next tire rotation.

Similarly, at block 912, in response to determining the current tire configuration is the second tire configuration, the distance targeter 320 is further to determine a vehicle distance to rotate back to the first tire configuration such that the total distance on the second tire configuration matches the total distance on the first tire configuration. In some examples, determining the vehicle distance for the next tire rotation to balance (e.g., equalize) the distance traveled on the first and second tire configuration at block 912 further utilizes the algorithm described in conjunction with block 910.

At block 914, the distance targeter 320 is further to distribute the targeted distance determined at block 910 or block 912 to the service record storer 326. In response to storage of the targeted distance, the example 802 of FIG. 9 ends and processing returns to block 804 of the example method of FIG. 8.

Figure 10:
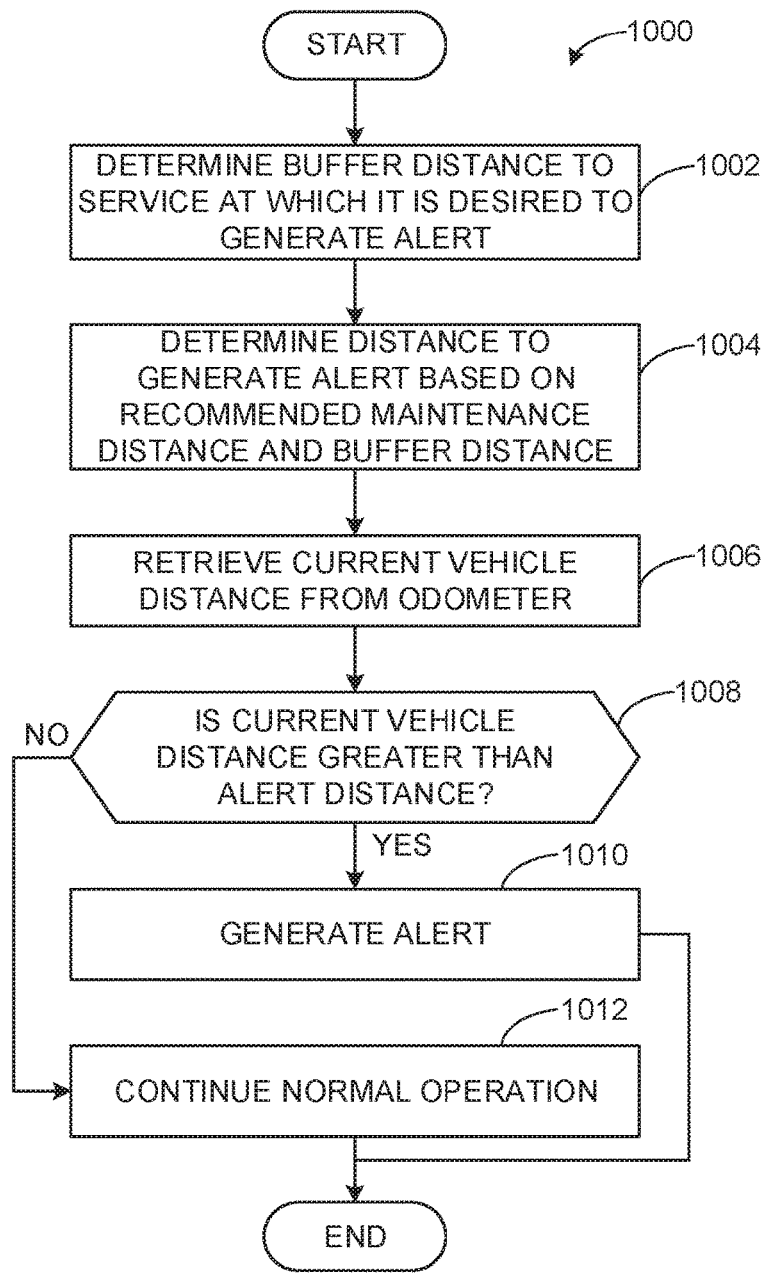

The example method 1000 of FIG. 10 begins at block 1002. At block 1002, the target maintenance alert generator 322 determines a buffer distance before maintenance is targeted (e.g., a certain distance until which a maintenance event is targeted) at which a user of the vehicle 102 is to be alerted regarding an upcoming or past due maintenance event.

At block 1004, the target maintenance alert generator 322 is further to utilize the buffer distance calculated at block 1002 in addition to the targeted maintenance distance previously calculated by the distance targeter 320 to determine a vehicle alert distance to alert the user of the vehicle 102 to the upcoming or past due maintenance event. In some examples, determining the vehicle alert distance to alert the user further includes subtracting the buffer distance from the targeted maintenance distance.

At block 1006, the target maintenance alert generator 322 retrieves the current vehicle distance from the odometer 314. At block 1008, the target maintenance alert generator 322 determines whether the current vehicle distance retrieved form the odometer 314 is greater than the vehicle alert distance. In response to the current vehicle distance (e.g., the odometer 314 distance) being greater than or equal to the vehicle alert distance, processing transfers to block 1010. Alternatively, in response to the current vehicle distance being less than the vehicle alert distance, processing transfers to block 1012.

At block 1010, the target maintenance alert generator 322 generates an alert for distribution to a display, an audio system, or other device capable of notifying a user of the vehicle 102. In some examples, the alert can include a vehicle distance (e.g., the odometer 314 distance) at which maintenance is required (e.g., targeted). Additionally or alternatively, the alert can include a distance until maintenance is targeted (e.g., the odometer 314 distance subtracted from the vehicle alert distance). Additionally or alternatively, the alert can include a suggested service station and time to schedule a maintenance event for the vehicle 102 utilizing the maintenance scheduler 324.

At block 1012, in response to the current vehicle distance (e.g., the odometer 314 distance) being less than the vehicle alert distance, the vehicle 102 continues normal operation and the target maintenance alert generator 322 does not generate an alert. After completion of at least one of block 1010 or block 1012, the example method 1000 of FIG. 10 ends.

Figure 11:
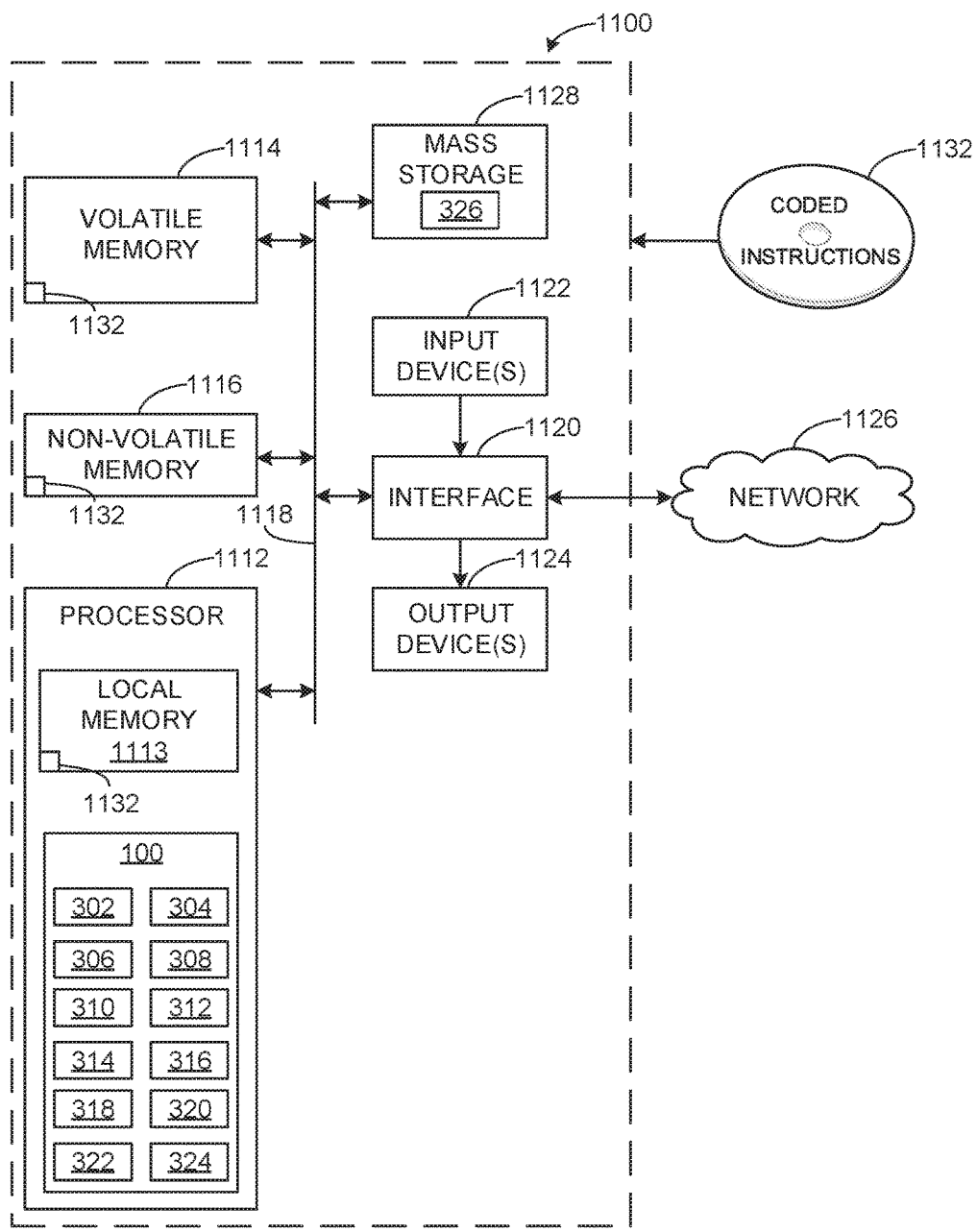
FIG. 11 is a block diagram of an example processor platform structured to execute machine readable instructions to implement the methods of FIGS. 6-10 and the example vehicle maintenance diagnostic processor of FIGS. 1 and/or 3.

FIG. 11 is a block diagram of an example processor platform 1100 capable of executing instructions to implement the methods of FIGS. 6-10 and the vehicle maintenance diagnostic processor 100 of FIG. 3. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor 1112 implements the example vehicle maintenance diagnostic processor 100 which can, in some examples, include or otherwise implement the example tire location data collector 302, the example fluid level data collector 304, the example maintenance event detector 306, the example parameter recorder 308, the example GPS 310, the example clock 312, the example odometer 314, the example maintenance event validator 316, the example improper maintenance alert generator 318, the example distance targeter 320, the example target maintenance alert generator 322, and the example maintenance scheduler 324.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives. Blu-ray disk drives. RAID systems, and digital versatile disk (DVD) drives.

The coded instructions 1132 of FIGS. 6-10 may be stored in the mass storage device 1128, in the volatile memory 1114, in the non-volatile memory 1116, and/or on a removable tangible computer readable storage medium such as a CD or DVD.

From the foregoing, it will be appreciated that example methods, apparatus and articles of manufacture have been disclosed that are capable of automating the detection and recording of vehicle maintenance events including at least one of tire rotations and fluid changes. Vehicles that do not receive regularly scheduled maintenance can experience unnecessary wear that is not experienced by vehicles that receive regular maintenance. Additionally, not completing and documenting the maintenance can void a warranty the consumer has for the vehicle. As such, automatically detecting and recording maintenance events will not only mitigate wear on the vehicle, but will also simplify warranty disputes regarding maintenance completed on the vehicle. Further, a manufacturer or dealer my use these notifications to suggest or incentivize the use of their facility for the purchase of service.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a maintenance event detector to detect a first maintenance event associated with a vehicle, the first maintenance event being a tire rotation event in which tires of the vehicle are changed from a first tire configuration to a second tire configuration;
a parameter recorder to store in a service log a vehicle location, a time, and a vehicle travel distance at which the first maintenance event occurred; and
a distance targeter to:
determine a target distance for a second maintenance event based on information stored in the service log; and
modify the target distance to a modified target distance such that a first distance traveled on the first tire configuration matches a second distance to be traveled on the second tire configuration.

2. The apparatus of claim 1, wherein the maintenance event detector is further to detect the tire rotation event when one or more of the tires change location on the vehicle.

3. The apparatus of claim 2, further including a maintenance event validator to determine whether the second tire configuration matches a target second tire configuration when the tire rotation event is detected.

4. The apparatus of claim 3, further including an improper maintenance alert generator to alert a user of the vehicle when the second tire configuration does not match the target second tire configuration.

5. The apparatus of claim 1, wherein the parameter recorder is further to determine a service station that completed the first maintenance event based on the vehicle location.

6. The apparatus of claim 1, further including a target maintenance alert generator to alert a user of the vehicle that the second maintenance event is targeted based on a current vehicle travel distance and the modified target distance for the second maintenance event.

7. The apparatus of claim 1, wherein the distance targeter is further to determine a difference between the first distance traveled on the first tire configuration and the second distance traveled on the second tire configuration, the modified target distance based on the difference.

8. An apparatus comprising:
a vehicle maintenance diagnostic processor programmed to detect a first tire rotation event, wherein the processor is to record a vehicle location, a time, and a vehicle travel distance for the first tire rotation event and modify a target distance for a second tire rotation event such that a first distance traveled on a first configuration of tire locations matches a second distance traveled on a second configuration of tire locations.

9. The apparatus of claim 8, wherein the vehicle maintenance diagnostic processor is further programmed to detect the first tire rotation event when the first configuration of tire locations changes to the second configuration of tire locations, wherein tire locations are determined by comparing orientation data of one or more tire pressure monitoring system sensors with displacement data for one or more wheel assemblies.

10. The apparatus of claim 9, wherein the vehicle maintenance diagnostic processor is further programmed to determine whether the second configuration of tire locations matches a target second configuration of tire locations when the first tire rotation event is detected.

11. The apparatus of claim 10, wherein the vehicle maintenance diagnostic processor is further programmed to alert a user of the vehicle when the second configuration of tire locations does not match the target second configuration of tire locations.

12. The apparatus of claim 8, wherein the vehicle maintenance diagnostic processor is further programmed to determine a service station that completed the first tire rotation event based on the vehicle location.

13. The apparatus of claim 8, wherein the vehicle maintenance diagnostic processor is further programmed to alert a user of the vehicle that the second tire rotation event is targeted based on a current vehicle travel distance and the target distance for the second tire rotation event.

14. The apparatus of claim 8, wherein the vehicle maintenance diagnostic processor is further programmed to determine a difference between the first distance traveled on the first configuration of tire locations and the second distance traveled on the second configuration of tire locations, the modification of the target distance based on the difference.

15. A method comprising:
detecting a first maintenance event including at least one of a tire rotation event or a fluid change event;
storing, in a service log, a vehicle location, a time, and a vehicle travel distance at which the first maintenance event occurred in response to detecting the first maintenance event; and
determining a target distance for a second maintenance event based on information stored in the service log, further including modifying the target distance such that a first distance traveled on a first configuration of tire locations matches a second distance traveled on at least a second configuration of tire locations when the first and second maintenance events are tire rotations.

16. The method of claim 15, wherein detecting the first maintenance event further includes at least one of:
  detecting the tire rotation event in response to one or more tires changing location on a vehicle; or
  detecting the fluid change event in response to a level of a fluid changing from a first level to a second level.

17. The method of claim 16, further including at least one of:
  determining whether the second configuration of tire locations matches a target second configuration of tire locations in response to detecting the tire rotation event; or
  determining whether the second level of the fluid is within a tolerance of a target level for the fluid in response to detecting the fluid change event.

18. The method of claim 15, further including determining a service station that completed the first maintenance event based on correlating the vehicle location to the service station.

19. The method of claim 15, further including alerting a user of a vehicle that the second maintenance event is targeted based on a current vehicle travel distance and the target distance for the second maintenance event.

20. The method of claim 15, further including determining a difference between the first distance traveled on the first configuration of tire locations and the second distance traveled on the second configuration of tire locations, the modifying of the target distance based on the difference.

* * * * *